US011688391B2

(12) United States Patent
Yuan

(10) Patent No.: US 11,688,391 B2
(45) Date of Patent: Jun. 27, 2023

(54) MANDARIN AND DIALECT MIXED MODELING AND SPEECH RECOGNITION

(71) Applicant: BEIJING BAIDU NETCOM SCIENCE AND TECHOLOGY CO., LTD., Beijing (CN)

(72) Inventor: Shenglong Yuan, Beijing (CN)

(73) Assignee: BEIJING BAIDU NETCOM SCIENCE AND TECHNOLOGY CO., Beijing (CN)

( * ) Notice: Subject to any disclaimer, the term of this patent is extended or adjusted under 35 U.S.C. 154(b) by 261 days.

(21) Appl. No.: 16/843,174

(22) Filed: Apr. 8, 2020

(65) Prior Publication Data
US 2020/0327883 A1  Oct. 15, 2020

(30) Foreign Application Priority Data
Apr. 15, 2019 (CN) .......................... 201910297805.X

(51) Int. Cl.
*G10L 15/14* (2006.01)
*G10L 15/16* (2006.01)
*G10L 25/30* (2013.01)

(52) U.S. Cl.
CPC ............ *G10L 15/144* (2013.01); *G10L 15/16* (2013.01); *G10L 25/30* (2013.01)

(58) Field of Classification Search
CPC ....... G10L 15/144; G10L 15/16; G10L 25/30; G10L 15/02; G10L 15/063; G10L 15/142; G10L 15/18; G10L 25/18; G10L 25/24
See application file for complete search history.

(56) References Cited

U.S. PATENT DOCUMENTS

2005/0055209 A1\* 3/2005 Epstein ............... G10L 15/1815
704/E15.024
2008/0146895 A1\* 6/2008 Olson .................... G16H 40/67
600/301

(Continued)

FOREIGN PATENT DOCUMENTS

CN  105632501 A  6/2016
CN  106251859 A  12/2016
(Continued)

OTHER PUBLICATIONS

Office Action for Chinese Application No. 201910297805.X, dated Aug. 5, 2020, 13 pages.

(Continued)

*Primary Examiner* — Michael N Opsasnick
(74) *Attorney, Agent, or Firm* — Lippes Mathias LLP

(57) ABSTRACT

The present disclosure provides a modeling method for speech recognition and a device. The method includes: determining N types of tags; training a neural network according to speech data of Mandarin to generate a recognition model whose outputs are the N types of tags; inputting speech data of each dialect into the recognition model to obtain an output tag of each frame of the speech data of each dialect; determining, according to the output tags and tagged true tags, error rates of the N types of tags for the each dialect, generating M types of target tags according to tags with error rates greater than a preset threshold; and training an acoustic model according to third speech data of Mandarin and third speech data of the P dialects, outputs of the acoustic model being the N types of tags and the M types of target tags corresponding to each dialect.

15 Claims, 3 Drawing Sheets

(56) References Cited

U.S. PATENT DOCUMENTS

| | | | |
|---|---|---|---|
| 2008/0201145 A1 | 8/2008 | Chen et al. | |
| 2013/0262111 A1 | 10/2013 | Eller et al. | |
| 2014/0067735 A1 | 3/2014 | Yu et al. | |
| 2015/0039299 A1* | 2/2015 | Weinstein | G10L 15/16 704/202 |
| 2015/0287405 A1* | 10/2015 | Biadsy | G10L 15/063 704/257 |
| 2016/0247501 A1* | 8/2016 | Kim | G06N 20/00 |
| 2017/0092268 A1* | 3/2017 | Kristjansson | G10L 15/16 |
| 2017/0148431 A1 | 5/2017 | Catanzaro et al. | |
| 2018/0204111 A1* | 7/2018 | Zadeh | G06N 3/0436 |
| 2018/0366112 A1* | 12/2018 | Aleksic | G10L 15/22 |
| 2020/0175961 A1* | 6/2020 | Thomson | G10L 15/28 |

FOREIGN PATENT DOCUMENTS

| | | |
|---|---|---|
| CN | 106875942 A | 6/2017 |
| CN | 106919710 A | 7/2017 |
| CN | 107452379 A | 12/2017 |
| CN | 107735833 A | 2/2018 |
| CN | 107871497 A | 4/2018 |
| CN | 108172218 A | 6/2018 |
| CN | 108711421 A | 10/2018 |
| CN | 108831445 A | 11/2018 |

OTHER PUBLICATIONS

Jiangyan Yi et al., "CTC Regularized Model Adaptation for Improving LSTM RNN Based Multi-Accent Mandarin Speech Recognition", National Laboratory of Pattern Recognition, Institute of Automation, Chinese Academy of Sciences, Beijing, China, 5 pages.

Xin Chen et al., "Deep Neural Network Acoustic Modeling for Native and Non-native Mandarin Speech Recognition", Knowledge Technologies, 2014, IEEE, 4 pages.

Cui Rui-Lian et al., "Language Identification Based on Deep Neural Network", National Engineering Laboratory for Speech and Language Information Processing, University of Science and Technology of China, vol. 28, No. 12, Dec. 2015, 4 pages. (Abstract in English).

Yuan Sheng-Long et al., "Speech Recognition Based on Deep Neural Networks on Tebetan Corpus", National Engineering Laboratory for Speech and Language Information Processing, Dept. of Electronic Engineering and Information Science, Univ. of Science and Technology of China, vol. 28, No. 3, Mar. 2015, 3 pages. (Abstract in English).

Shi Jia-ying et al., "Sichuan Dialect Speech Recognition Based on Deep Neural Network", College of Software Engineering, Sichuan University, May 2016, 6 pages. (Abstract in English).

* cited by examiner

MANDARIN AND DIALECT MIXED MODELING AND SPEECH RECOGNITION

CROSS-REFERENCE TO RELATED APPLICATION

This application claims priority to and benefits of Chinese Patent Application Serial No. 201910297805.X, filed the State Intellectual Property Office of P. R. China on Apr. 15, 2019, the entire content of which is incorporated herein by reference.

FIELD

The present disclosure relates to the technical field of speech recognition, and more particularly, to a modeling method for speech recognition, an apparatus and a device.

BACKGROUND

With the development of speech recognition technologies, performance of speech recognition has met practical requirements. For example, various input methods on mobile phones have speech interaction functions. In actual applications, in addition to speech recognition in Mandarin scenes, there is also speech recognition in dialect scenes. At present, there are many speech interaction products that support speech recognition of dialects. For example, with speech recognition options on a mobile phone input method, a user can choose a dialect according to his/her need, and some smart TVs and smart refrigerators are customized for specific dialects.

In the related art, generally, a Mandarin recognition model is used for speech recognition of Mandarin, and a dialect recognition model is used for speech recognition of a corresponding dialect, so that when a user switches languages, they need to select a corresponding speech recognition model again and again.

SUMMARY

An embodiment according to the present disclosure provides a modeling method for speech recognition, including: processing first speech data of Mandarin and first speech data of P dialects respectively based on a pre-trained alignment model to obtain a tag corresponding to each frame of the first speech data, and counting the obtained tags and performing deduplication on tags of each type to determine N types of tags, N being a positive integer and P being a positive integer; training a neural network according to second speech data of Mandarin, and generating a recognition model when the neural network converges, in which outputs of the recognition model are the N types of tags; inputting second speech data of the P dialects into the recognition model for processing respectively to obtain an output tag of each frame of the second speech data of each dialect; determining, according to the output tags and tagged true tags of the second speech data of each dialect, an error rate of each type of the N types of tags for each of the P dialects, and generating M types of target tags according to M types of tags whose error rates are greater than a preset threshold, M being an integer greater than or equal to zero; and training an acoustic model according to third speech data of Mandarin and third speech data of the P dialects, in which outputs of the acoustic model are the N types of tags and the M types of target tags corresponding to each of the P dialects.

An embodiment according to the present disclosure provides a modeling apparatus for speech recognition, including: an alignment module, configured to process first speech data of Mandarin and first speech data of P dialects respectively based on a pre-trained alignment model to obtain a tag corresponding to each frame of the first speech data, and to count the obtained tags and to perform deduplication on tags of each type to determine N types of tags, N being a positive integer and P being a positive integer; a first training module, configured to train a neural network according to second speech data of Mandarin, and to generate a recognition model when the neural network converges, wherein outputs of the recognition model are the N types of tags; a processing module, configured to input second speech data of the P dialects into the recognition model for processing to obtain an output tag of each frame of the second speech data of each dialect; a generation module, configured to determine, according to the output tags and tagged true tags of the second speech data of each dialect, an error rate of each type of the N types of tags for each of the P dialects, and to generate M types of target tags according to M types of tags whose error rates are greater than a preset threshold, M being an integer greater than or equal to zero; and a second training module, configured to train an acoustic model according to third speech data of Mandarin and third speech data of the P dialects, in which outputs of the acoustic model are the N types of tags and the M types of target tags corresponding to each of the P dialects.

An embodiment according to the present disclosure provides a computer device, including a processor and a memory. The processor is configured to run a program corresponding to executable program codes by reading the executable program codes stored in the memory, to implement the modeling method for speech recognition as described in the embodiment according to the first aspect.

An embodiment according to the present disclosure provides a computer readable storage medium having a computer program stored thereon. When the program is executed by a processor, the modeling method for speech recognition as described in the embodiment according to the first aspect is implemented.

Additional aspects and advantages of embodiments of present disclosure will be given in part in the following descriptions, become apparent in part from the following descriptions, or be learned from the practice of the embodiments of the present disclosure.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are exemplary, are merely used to explain the present disclosure, and cannot be construed as a limit to the present disclosure.

In the related art, generally, a Mandarin recognition model is used for speech recognition of Mandarin, and a dialect recognition model is used for speech recognition of a corresponding dialect, so that when a user switches languages, they need to select a corresponding speech recognition model again and again, and thus the operations are tedious. In addition, as more and more dialects are to be supported, the workload and maintenance costs are high.

Therefore, the present disclosure provides a modeling method for speech recognition, an apparatus and a device.

The following describes a modeling method for speech recognition, an apparatus and a device according to embodiments of the present disclosure with reference to the accompanying drawings.

Figure 1:
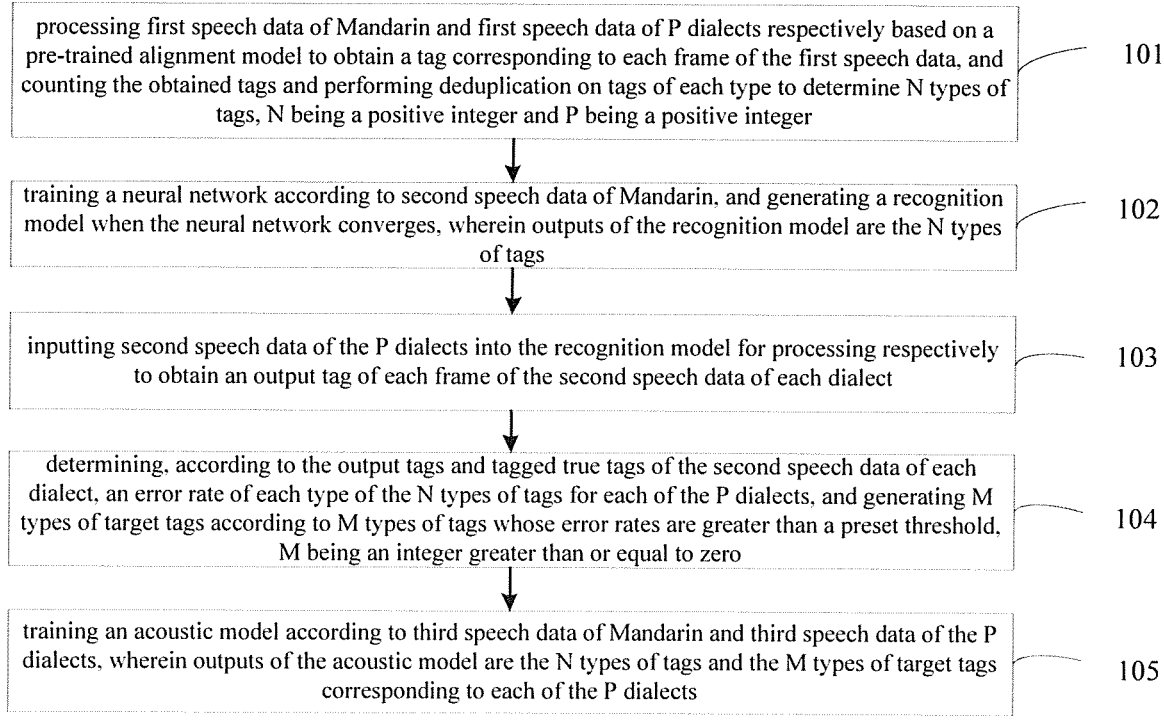
FIG. 1 is a flowchart of a modeling method for speech recognition according to an embodiment of the present disclosure.

FIG. 1 is a flowchart of a modeling method for speech recognition according to an embodiment of the present disclosure. As shown in FIG. 1, the method includes the following.

At block 101, first speech data of Mandarin and first speech data of P dialects are processed respectively based on a pre-trained alignment model to obtain a tag corresponding to each frame of the first speech data, and the obtained tags are counted and deduplication is performed on tags of each type to determine N types of tags, N being a positive integer and P being a positive integer.

In the related art, when speech recognition is performed for Mandarin and dialects, it is necessary to switch to a corresponding speech recognition model for recognition. The switching operations are tedious. In addition, when the number of dialects increases, corresponding speech recognition models need to be added, and thus the costs are high. Therefore, the embodiment of the present disclosure provides the modeling method for speech recognition, which realizes mixed modeling of Mandarin and dialects, so that one model may be used to recognize both Mandarin and dialects.

In the embodiment of the present disclosure, when the mixed modeling of Mandarin and dialects is performed, the speech data of both Mandarin and the dialects may be aligned at a frame level according to the pre-trained alignment model to determine the N types of tags, thereby ensuring accordance of modeling units between Mandarin and the dialects.

A tag is the content corresponding to each frame of the speech data. For example, a tag corresponding to each frame of speech data is determined according to an acoustic model in a related speech recognition model, and a recognition text is obtained according to a language model in the speech recognition model and the tags.

For example, the alignment model may be pre-trained according to speech data of Mandarin. Input of the alignment model is characteristics of each frame of the speech data and output of the alignment model is a tag corresponding to each frame of the speech data. Further, collected speech data of Mandarin, speech data of dialect A and speech data of dialect B are input into the alignment model, and the tag corresponding to each frame of the speech data is output. Further, counting and deduplication are performed on the output tags to determine the N types of tags as nodes of an output layer of a neural network in subsequent actions.

For example, if N is 2,000, 2,000 different tags may be determined after alignment. Thus, frame-level alignment of dialects and Mandarin is realized, and the accordance of the modeling units between the dialects and Mandarin is ensured.

In an embodiment of the present disclosure, the alignment model may be implemented based on a Gaussian mixture model. The speech data of Mandarin and tagged text information corresponding to the speech data of Mandarin may be collected in advance, where one or more tags corresponding to each word are known in the text information. Furthermore, a Mel Frequency Cepstrum Coefficient (MFCC) characteristic of each frame of the speech data is extracted, and the alignment model is generated, according to the MFCC characteristic and the text information, by training parameters of the Gaussian mixture model based on maximum likelihood estimation, such that the input of the alignment model is the MFCC characteristic of each frame of the speech data, and the output is the tag corresponding to each frame of the speech data.

At block 102, a neural network is trained according to second speech data of Mandarin, and a recognition model is generated when the neural network converges, in which outputs of the recognition model are the N types of tags.

In an embodiment of the present disclosure, after the N types of tags are determined, speech data of Mandarin may be collected to train the neural network, so that the number of nodes in an output layer of the neural network is N, and the N nodes in the output layer of the neural network respectively correspond to the N types of tags. The neural network may be a DNN-HMM (Deep Neural Network-Hidden Markov Model).

As a possible implementation, the speech data of Mandarin and tags tagged correspondingly may be collected, and a filter bank coefficient characteristic is extracted from the speech data of Mandarin. The neural network is trained according to a training criterion of CTC (connectionist temporal classification), in which the training criterion of CTC may be as following formula, $$\frac{\partial O}{\partial a^k} = y^k - \frac{1}{p(z|x)} \sum_{s \in label(z,k)} \alpha(s)\beta(s)$$

In detail, $y^k$ is a score of a tag k referenced at a certain moment, $\sum_{s \in label(z,k)} \alpha(s)\beta(s)$ represents a score, obtained by multiplying a forward score by a backward score of CTC, that belongs to the tag k in a CTC path at the certain moment, and $P(z|x)$ is a total score of a path passed by the CTC at the certain moment. Furthermore, the recognition model is generated when the neural network converges, the output layer of the recognition model is the N types of tags, and the recognition model may be used to recognize the speech data of Mandarin. By inputting the speech data of Mandarin into the recognition model, a tag corresponding to each frame of the speech data may be obtained.

At block 103, second speech data of the P dialects are inputted into the recognition model for processing respectively, to obtain an output tag of each frame of the second speech data of each dialect.

In an embodiment, speech data of the dialects may be collected, and the speech data of the dialects is input into the recognition model to be converted from the speech data into tags. The tag corresponding to each frame of the speech data of each dialect is obtained as a corresponding output tag.

In the following, description is made in combination with a processing process of the recognition model.

Figure 2:
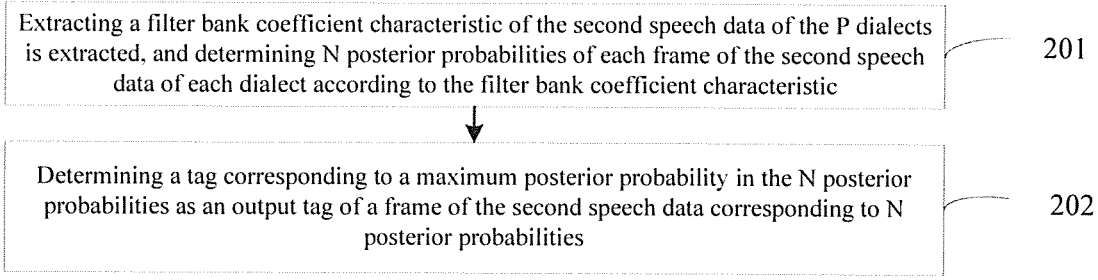
FIG. 2 is a flowchart of determining an output tag according to an embodiment of the present disclosure.

FIG. 2 is a flowchart of determining an output tag according to an embodiment of the present disclosure. As shown in FIG. 2, the following is included.

At block 201, a filter bank coefficient characteristic of the second speech data of the P dialects is extracted, and N posterior probabilities of each frame of the second speech data of each dialect are determined according to the filter bank coefficient characteristic.

In this embodiment, since the N types of tags are determined based on the alignment model, the outputs of the recognition model are the N types of tags. The filter bank coefficient characteristics of the speech data of the dialects may be extracted and then input into the recognition model for processing. For each frame of the speech data of each dialect, the N posterior probabilities may be output. For example, a one-dimensional array with a length N may be output, each value in the array representing a posterior probability of each tag.

At block 202, a tag corresponding to a maximum value in the N posterior probabilities is determined as an output tag of a frame of the second speech data corresponding to the N posterior probabilities.

In this embodiment, for each frame of the speech data of each dialect, the maximum posterior probability is determined among the N posterior probabilities, and the tag corresponding to the maximum posterior probability is determined as the output tag of a corresponding frame of the speech data.

For example, N is 2,000, and the speech data of dialect A and the speech data of dialect B are respectively input to the recognition model, and thus corresponding forward scores, i.e., the posterior probabilities of the output layer of the recognition model are respectively obtained. Since there are 2,000 nodes in the output layer, for each frame of the speech data of dialect A and dialect B, a one-dimensional array with a length of 2,000 may be obtained. Each value in the array represents a posterior probability of a tag. Furthermore, the tag corresponding to the maximum value in each array is determined as the output tag of the corresponding frame of speech data.

At block 104, an error rate of each type of the N types of tags is determined for each of the P dialects according to the output tags and tagged true tags of the second speech data, and M types of target tags are generated according to M types of tags whose error rates are greater than a preset threshold, M being an integer greater than or equal to zero.

In an embodiment of the present disclosure, when the second speech data of the dialects in the above steps is collected, the tagged true tags corresponding to the second speech data may be obtained. Both the output tags and the true tags belong to the N types of tags.

It may be understood that, since the recognition model is trained based on the speech data of Mandarin, the output tags obtained by inputting the speech data of the dialects into the recognition model for processing may be not accurate enough. Therefore, tags that are accurately recognized can be further determined as tags commonly used for both Mandarin and a dialect, and the target tags may be newly generated and determined as tags used for the dialect alone according to tags that cannot be accurately recognized.

For example, the dialect is dialect A. For each frame of the speech data of dialect A, the output tags corresponding to the frame are matched with the tagged true tags of the frame. If the output tags are consistent with the tagged true tags, it is indicated that the classification of the tags is correct; otherwise, the tags are misclassified. Furthermore, the number of misclassifications for each tag is counted, and normalization is performed based on the total number of each tag to obtain an error rate of classification of each tag. For example, the number of Tag 1 in the tagged true tags is 10. If 5 of the corresponding output tags are Tag 1 and the other 5 are other tags except Tag 1, the error rate of Tag 1 is determined to be 50%.

In this embodiment, for each dialect, after the error rate of each tag in the N types of tags is determined, the error rate may be compared with the preset threshold. A tag with an error rate less than or equal to the preset threshold is determined as a tag used for both Mandarin and the dialect, and a target tag is generated according to a tag whose error rate is greater than the preset threshold. That is, for each dialect, M types of tags with relative high error rates may be determined from the N types of tags, and M types of target tags generated correspondingly according to the M types of tags are determined as tags possessed by the dialect alone. Each of the M types of target tags is different from any of the N types of tags. The preset threshold may be determined based on a large amount of experimental data, or may be set according to needs, which is not limited herein. For example, the preset threshold may be 90%.

It should be noted that, in this embodiment, in a case where different dialects exist, the error rate of each tag is determined for each dialect. For example, M1 target tags may be determined for dialect A, and M2 target tags may be determined for dialect B. For a specific implementation of the case where different dialects exist, reference may be made to the foregoing embodiments, and details will not be described herein again.

In an embodiment of the present disclosure, for each dialect, after the M types of target tags are generated according to the M types of tags whose error rates are greater than the preset threshold, a decoding dictionary may be updated according to the M types of target tags, adding corresponding pronunciations to the target tags in the decoding dictionary. The decoding dictionary includes a mapping from words to phonemes, and is configured to connect the acoustic model and the language model.

At block 105, the acoustic model is trained according to third speech data of Mandarin and third speech data of the P dialects, in which outputs of the acoustic model are the N types of tags and the M types of target tags corresponding to each of the P dialects.

In the embodiment of the present disclosure, after the M types of target tags are determined for each of the P dialects, the acoustic model may be trained according to the speech data of both Mandarin and the dialects. The outputs of the acoustic model are the N types of tags and M types of target tags corresponding to the each of the P dialects. Therefore, both Mandarin and the P dialects may be recognized through the acoustic model, and the accuracy of the recognition is ensured. Thereby, the speech recognition model may be constructed based on the acoustic model, a related language model and the decoding dictionary, so that the speech recognition may be performed on Mandarin and different dialects through one speech recognition. The acoustic model may be a DNN-HMM model.

Taking Mandarin and dialect A as an example, N is 2,000, and the preset threshold is 90%. For dialect A, if the number of tags whose error rates being greater than 90% in the 2,000 tags is 400, 400 modeling units, i.e., the 400 tags whose error rates being greater than 90%, are listed separately as additional modeling units. Furthermore, the acoustic model is trained according to the speech data of Mandarin and the speech data of dialect A, so that the number of nodes in the output layer of the acoustic model is 2,400. 1,600 nodes of the 2,000 nodes are shared by Mandarin and dialect A, 400 nodes are used for Mandarin alone, and an additional 400 nodes are used for dialect A alone.

Figure 3:
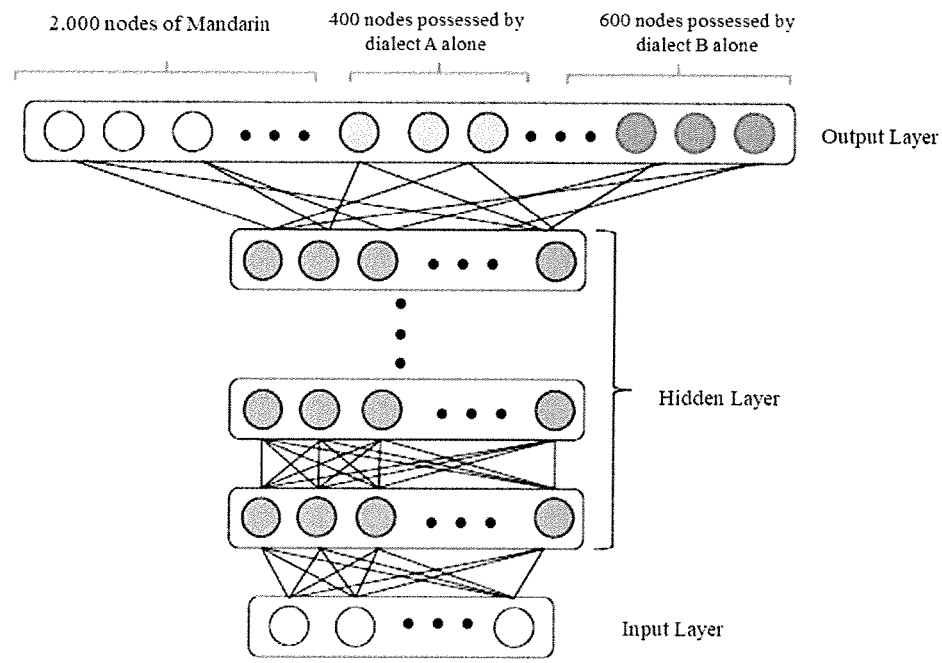
FIG. 3 is a schematic diagram of an acoustic model according to an embodiment of the present disclosure.

For another example, referring to FIG. 3, taking Mandarin, dialect A and dialect B as an example, N is 2,000 and the preset threshold is 90%. For dialect A, if the number of tags whose error rates being greater than 90% in the 2,000 tags is 400, the 400 modeling units are listed separately as additional modeling units. For dialect B, if the number of tags whose error rates being greater than 90% is 600, the 600 modeling units are listed separately as additional modeling units. Furthermore, the acoustic model is trained according to the speech data of Mandarin, the speech data of dialect A and the speech data of dialect B, so that the number of nodes in the output layer of the acoustic model is 3,000. For dialect A, 1,600 of the 3,000 nodes are shared by Mandarin and dialect A, 400 nodes are used for Mandarin alone, and additional 400 nodes are used for dialect A alone. For dialect B, 1,400 nodes are shared by Mandarin and dialect B, 600 nodes are used for Mandarin alone, and additional 600 nodes are used for dialect B alone.

In an embodiment of the present disclosure, speech data of Mandarin and speech data of the P dialects may be collected, and tags may be tagged for the speech data of Mandarin as first tagged tags, and tags may be tagged for the speech data of the P dialects as second tagged tags. The first tagged tags are obtained by inputting the speech data of Mandarin into the pre-trained alignment model, and the second tagged tags are obtained by inputting the speech data of each of the P dialects into the pre-trained alignment model. Furthermore, a training sample set is generated according to the collected speech data and tags tagged correspondingly. For the speech data of each of the P dialects, the M types of tags originally tagged whose error rates are greater than the preset threshold are replaced with corresponding M types of target tags to obtain updated training samples. For example, for dialect A, if the error rate of tag 1 is greater than 90%, tag 1 originally tagged is replaced with target tag 1'. Furthermore, processing parameters of a preset model are trained according to a preset objective function and the updated training samples in the training sample set to generate the acoustic model, so that the input of the acoustic model is speech data and the output of the acoustic model is a tag or a target tag corresponding to each frame of the speech data. The preset model may be a DNN-HMM, etc., and the acoustic model may be trained based on the CTC training criteria. The implementation may be referred to the recognition model, and may not be repeated herein.

It should be noted that, the speech data of Mandarin in different steps in this embodiment may be the same or different, and so does the speech data of the dialects. The speech data may be selected according to needs, and is not limited herein.

According to the modeling method for speech recognition according to the embodiments of the present disclosure, the first speech data of Mandarin and the first speech data of the P dialects are processed respectively according to the pre-trained alignment model to obtain the tag corresponding to each frame of the first speech data, and the obtained tags are counted and the deduplication is performed on the tags of each type to determine the N types of tags. Further, the neural network is trained according to the second speech data of Mandarin, and the recognition model with the outputs of the N types of tags is generated when the neural network converges. Further, the second speech data of the P dialects is inputted into the recognition model for processing respectively to obtain the output tag of each frame of the second speech data of each dialect. Further, the error rate of each type of the N types of tags for each of the P dialects is determined according to the output tags and the tagged true tags of the second speech data of each dialect, and the M types of target tags are generated according to the M types of tags whose error rates are greater than the preset threshold. Further, the acoustic model is trained according to the third speech data of Mandarin and the third speech data of the P dialects, the outputs of the acoustic model being the N types of tags and the M types of target tags corresponding to each of the P dialects. Consequently, for each dialect, corresponding target tags are generated based on an error rate of each tag in the recognition model trained based on Mandarin, and the acoustic model is generated according to existing tags and the target tags newly generated, so that the acoustic model may recognize the speech data of both Mandarin and the dialects, and determining the modeling unit according to the mistaken in classification of each frame of the speech data is realized. Thereby, mixed modeling of Mandarin and dialects is realized, so that while ensuring the accuracy of recognition, one model may support both Mandarin and several dialects. Therefore, it is unnecessary to switch between different models, thereby simplifying user operations and reducing maintenance costs.

To implement the above embodiments, the present disclosure further proposes a modeling apparatus for speech recognition.

Figure 4:
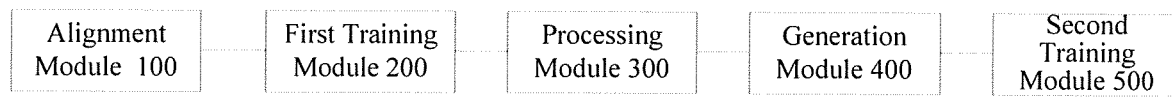
FIG. 4 is a block diagram of a modeling apparatus for speech recognition according to an embodiment of the present disclosure.

FIG. 4 is a block diagram of a modeling apparatus for speech recognition according to an embodiment of the present disclosure. As shown in FIG. 4, the apparatus includes: an alignment module 100, a first training module 200, a processing module 300, a generation module 400 and a second training module 500.

The alignment module 100 is configured to process the first speech data of Mandarin and the first speech data of the P dialects respectively based on the pre-trained alignment model to obtain the tag corresponding to each frame of the first speech data, and to count the obtained tags and to perform deduplication on tags of each type to determine the N types of tags, N being a positive integer and P being a positive integer.

The first training module 200 is configured to train a neural network according to second speech data of Mandarin, and to generate the recognition model when the neural network converges. The outputs of the recognition model are the N types of tags.

The processing module 300 is configured to input second speech data of the P dialects into the recognition model for processing to obtain the output tag of each frame of the second speech data of each dialect.

The generation module 400 is configured to determine, according to the output tags and the tagged true tags of the second speech data of each dialect, an error rate of each type of the N types of tags for each of the P dialects, and to generate the M types of target tags according to the M types of tags whose error rates are greater than the preset threshold, M being an integer greater than or equal to zero.

The second training module 500 is configured to train an acoustic model according to the third speech data of Mandarin and the third speech data of the P dialects. The outputs of the acoustic model are the N types of tags and the M types of target tags corresponding to each of the P dialects.

Figure 5:
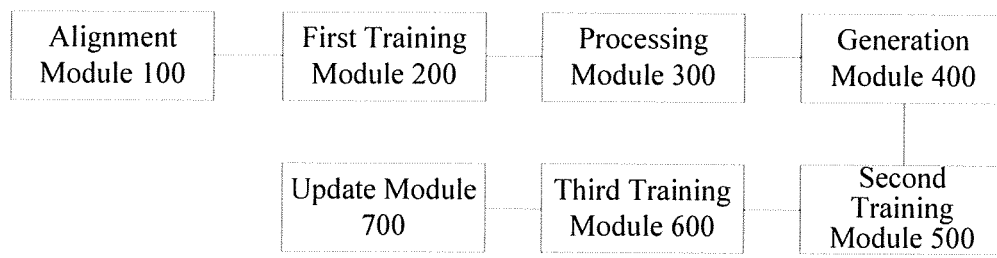
FIG. 5 is a block diagram of a modeling apparatus for speech recognition according to another embodiment of the present disclosure.

On the basis of FIG. 4, the apparatus illustrated in FIG. 5 further includes: a third training module 600 and an update module 700.

The third training module 600 is configured to obtain fourth speech data of Mandarin and corresponding text information, to extract a MFCC characteristic of each frame of the fourth speech data, and to generate, according to the MFCC characteristic and the text information, the alignment model by training a parameter of a Gaussian mixture model based on maximum likelihood estimation.

The update module 700 is configured to update a decoding dictionary according to the M types of target tags.

Alternatively, the processing module 300 is configured to: extract a filter bank coefficient characteristic of the second speech data of the P dialects, and determine the N posterior probabilities of each frame of the second speech data of each dialect according to the filter bank coefficient characteristic; and determine a tag corresponding to a maximum posterior probability in the N posterior probabilities as an output tag of a frame of the second speech data corresponding to the N posterior probabilities.

Alternatively, the second training module 500 is configured to: generate training samples according to the third speech data of Mandarin, first tagged tags corresponding to the third speech data of Mandarin, the third speech data of the P dialects and second tagged tag corresponding to the third speech data of the P dialects; for the third speech data of the each of the P dialects, the M types of tags originally tagged whose error rates are greater than the preset threshold are replaced with corresponding M types of target tags to obtain updated training samples; and train a processing parameter of a preset model according to a preset objective function and the updated training samples to obtain the acoustic model.

It should be noted that, the description of the modeling method for speech recognition in the foregoing embodiments is also applicable to the apparatus in this embodiment, and details will not be described herein again.

With the modeling apparatus for speech recognition according to the embodiment of the present disclosure, for each dialect, corresponding target tags are generated based on the error rate of each tag in the recognition model trained based on Mandarin, and the acoustic model is generated according to the tags existed and the newly generated target tags. Consequently, mixed modeling of Mandarin and dialects is realized as the acoustic model may recognize the speech data of both Mandarin and the dialects, so that while ensuring the accuracy of recognition, one model may support both Mandarin and several dialects. Therefore, it is unnecessary to switch between different models, thereby simplifying user operations and reducing maintenance costs.

In order to implement the above embodiments, the present disclosure further provides a computer device including a processor and a memory. The processor is configured to run a program corresponding to executable program codes by reading the executable program codes stored in the memory, to implement the modeling method for speech recognition as described in any of the above embodiments.

In order to implement the above embodiments, the present disclosure further provides a computer program product. The modeling method for speech recognition according to any of the above embodiments is implemented when instructions in the computer program product are executed by the processor.

In order to implement the above embodiments, the present disclosure further provides a computer readable storage medium having a computer program stored thereon. When the program is executed by a processor, the modeling method for speech recognition according to any of the above embodiments is implemented.

Figure 6:
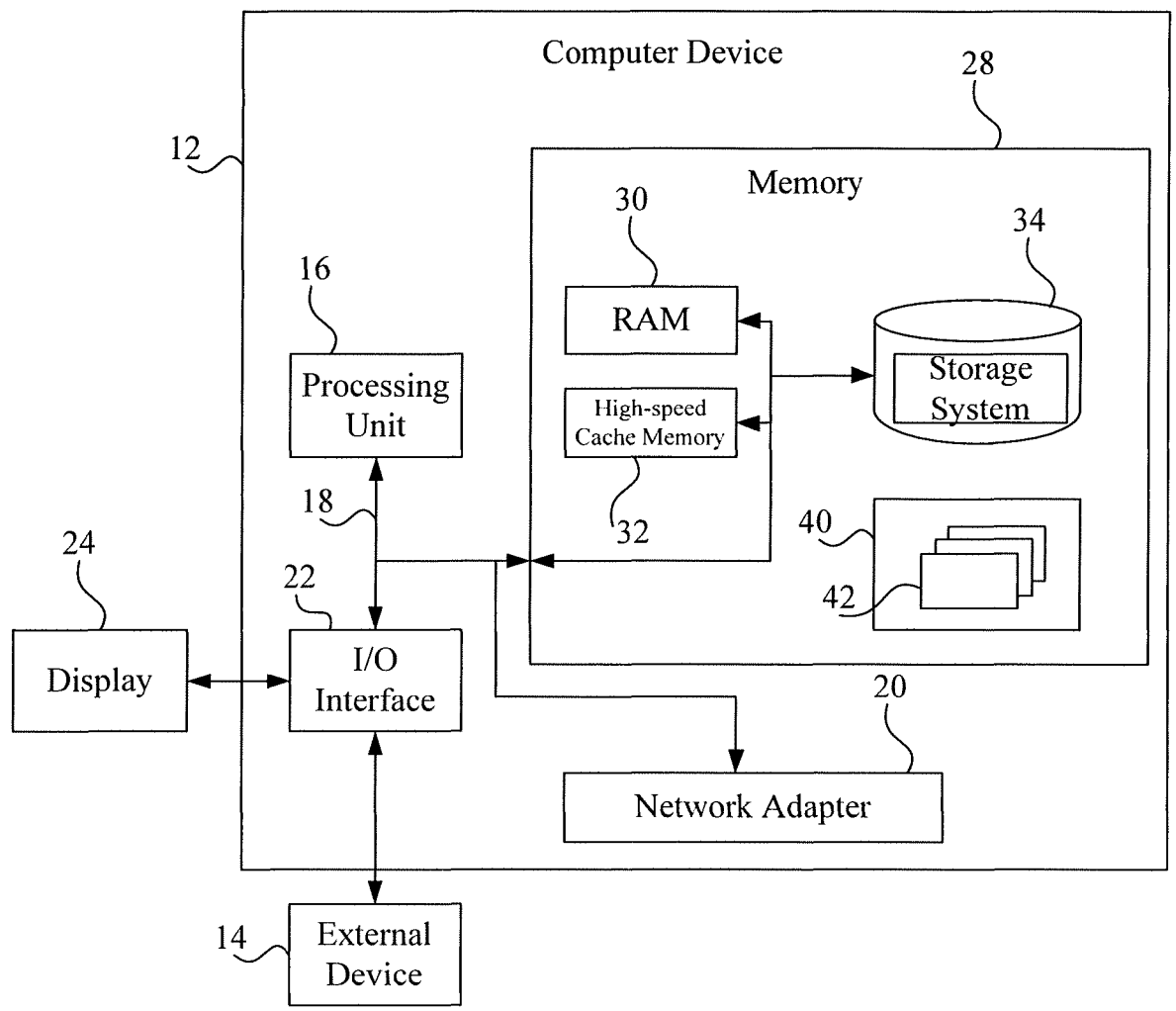
FIG. 6 is a schematic diagram of an exemplary computer device suitable for implementing embodiments of the present disclosure.

FIG. 6 is a block diagram of an exemplary computer device suitable for implementing embodiments of the present disclosure. The computer device 12 illustrated in FIG. 6 is only illustrated as an example, and should not be considered as any restriction on the function and the usage range of embodiments of the present disclosure.

As illustrated in FIG. 6, the computer device 12 is in the form of a general-purpose computing apparatus. The computer device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory controller, a peripheral bus, a graphic acceleration port (GAP), a processor, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the device 12 may include multiple kinds of computer-readable media. These media may be any storage media accessible by the computer device 12, including volatile and non-volatile medium and removable and non-removable medium.

The memory 28 may include a computer system readable medium in a form of volatile medium, such as a random access memory (RAM) 30 and/or a high-speed cache memory 32. The computer device 12 may further include other removable/non-removable storage media and volatile/non-volatile storage media. In way of example only, the storage system 34 may be used to read from and write to non-removable, non-volatile magnetic media (not shown in FIG. 6, commonly referred to as "hard disk drives"). Although not illustrated in FIG. 6, a disk driver for reading from and writing to removable non-volatile magnetic disks (e.g. "floppy disks"), as well as an optical driver for reading from and writing to removable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The device 12 may also communicate with one or more external devices 14 (e.g., a keyboard, a pointing device, a display 24, and etc.) and may also communicate with one or more devices that enable a user to interact with the computer system/server 12, and/or may communicate with any device (e.g., a network card, a modem, and etc.) that enables the computer system/server 12 to communicate with one or more other computing devices. This kind of communication can be achieved by an input/output (I/O) interface 22. In addition, the device 12 may be connected to and communicate with one or more networks such as a local area network (LAN), a wide area network (WAN) and/or a public network such as the Internet through a network adapter 20. As shown in FIG. 6, the network adapter 20 communicates with other modules of the device 12 over bus 18. It should be understood that although not shown in FIG. 6, other hardware and/or software modules may be used in combination with the device 12, which including, but not limited to, microcode, device drivers, redundant processing units, external disk drive arrays, RAID (redundant array of independent disks) systems, tape drives, as well as data backup storage systems and the like.

The processing unit 16 can perform various functional applications and data processing by running programs stored in the system memory 28, for example, to perform the method mentioned in embodiments of the present disclosure.

In the description of the present disclosure, it should be understood that, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the above embodiments without departing from the scope of the present disclosure.

What is claimed is:

1. A modeling method for speech recognition, comprising:

processing first speech data of Mandarin and first speech data of P dialects respectively based on a pre-trained alignment model to obtain a tag corresponding to each frame of the first speech data, and counting the obtained tags and performing deduplication on tags of each type to determine N types of tags, N being a positive integer and P being a positive integer;

training a neural network according to second speech data of Mandarin, and generating a recognition model when the neural network converges, wherein outputs of the recognition model are the N types of tags;

inputting second speech data of the P dialects into the recognition model for processing respectively to obtain an output tag of each frame of the second speech data of each dialect;

for each dialect i of the P dialects, determining, according to the output tags and tagged true tags of the second speech data of each dialect, an error rate of each type of the N types of tags, wherein the error rate of a specific type of tag is a ratio of a total number of misclassifications for the specific type of tag to a total number of the specific type of tag in the tagged true tags;

for each dialect i of the P dialects, generating, according to $M_i$ types of tags whose error rates are greater than a preset threshold, $M_i$ types of target tags specially used for the dialect i, where $M_i$ being an integer greater than or equal to zero, and $0 =< i <= P-1$; and training an acoustic model according to third speech data of Mandarin and third speech data of the P dialects, wherein outputs of the acoustic model are the N types of tags and the $M_i$ types of target tags corresponding to each dialect i of the P dialects.

2. The method of claim 1, wherein inputting the second speech data of the P dialects into the recognition model for processing respectively, to obtain the output tag of each frame of the second speech data of each dialect comprises:

extracting a filter bank coefficient characteristic of the second speech data of the P dialects, and determining N posterior probabilities of each frame of the second speech data of each dialect according to the filter bank coefficient characteristic; and determining a tag corresponding to a maximum posterior probability in the N posterior probabilities as an output tag of a frame of the second speech data corresponding to the N posterior probabilities.

3. The method of claim 1, wherein training the acoustic model according to the third speech data of Mandarin and the third speech data of the P dialects comprises:

generating training samples according to the third speech data of Mandarin, first tagged tags corresponding to the third speech data of Mandarin, the third speech data of the P dialects and second tagged tags corresponding to the third speech data of the P dialects;

for the third speech data of each dialect i of the P dialects, replacing the $M_i$ types of tags originally tagged whose error rates are greater than the preset threshold with corresponding $M_i$ types of target tags to obtain updated training samples; and training a processing parameter of a preset model according to a preset objective function and the updated training samples to obtain the acoustic model.

4. The method of claim 1, before processing the first speech data of Mandarin and the first speech data of the P dialects respectively based on the pre-trained alignment model, further comprising:

obtaining fourth speech data of Mandarin and corresponding text information; and extracting a MFCC characteristic of each frame of the fourth speech data, and generating, according to the MFCC characteristic and the text information, the alignment model by training a parameter of a Gaussian mixture model based on maximum likelihood estimation.

5. The method of claim 1, after generating the $M_i$ types of target tags specifically used for the dialect i according to the $M_i$ types of tags whose error rates are greater than the preset threshold, further comprising:

updating a decoding dictionary according to the $M_i$ types of target tags.

6. A computer device, comprising a processor and a memory, wherein, the processor is configured to run a program corresponding to executable program codes by reading the executable program codes stored in the memory, to implement a modeling method for speech recognition, comprising:

processing first speech data of Mandarin and first speech data of P dialects respectively based on a pre-trained alignment model to obtain a tag corresponding to each frame of the first speech data, and counting the obtained tags and performing deduplication on tags of each type to determine N types of tags, N being a positive integer and P being a positive integer;

training a neural network according to second speech data of Mandarin, and generating a recognition model when the neural network converges, wherein outputs of the recognition model are the N types of tags;

inputting second speech data of the P dialects into the recognition model for processing respectively to obtain an output tag of each frame of the second speech data of each dialect;

for each dialect i of the P dialects, determining, according to the output tags and tagged true tags of the second speech data of each dialect, an error rate of each type of the N types of tags, wherein the error rate of a specific type of tag is a ratio of a total number of misclassifications for the specific type of tag to a total number of the specific type of tag in the tagged true tags;

for each dialect i of the P dialects, generating, according to $M_i$ types of tags whose error rates are greater than a preset threshold, $M_i$ types of target tags specially used for the dialect i, where $M_i$ being an integer greater than or equal to zero, and $0=<i<=P-_1$; and training an acoustic model according to third speech data of Mandarin and third speech data of the P dialects, wherein outputs of the acoustic model are the N types of tags and the $M_i$ types of target tags corresponding to each dialect I of the P dialects.

7. The computer device of claim 6, wherein inputting the second speech data of the P dialects into the recognition model for processing respectively, to obtain the output tag of each frame of the second speech data of each dialect comprises:

extracting a filter bank coefficient characteristic of the second speech data of the P dialects, and determining N posterior probabilities of each frame of the second speech data of each dialect according to the filter bank coefficient characteristic; and determining a tag corresponding to a maximum posterior probability in the N posterior probabilities as an output tag of a frame of the second speech data corresponding to the N posterior probabilities.

8. The computer device of claim 6, wherein training the acoustic model according to the third speech data of Mandarin and the third speech data of the P dialects comprises:

generating training samples according to the third speech data of Mandarin, first tagged tags corresponding to the third speech data of Mandarin, the third speech data of the P dialects and second tagged tags corresponding to the third speech data of the P dialects;

for the third speech data of each dialect I of the P dialects, replacing the $M_i$ types of tags originally tagged whose error rates are greater than the preset threshold with corresponding $M_i$ types of target tags to obtain updated training samples; and training a processing parameter of a preset model according to a preset objective function and the updated training samples to obtain the acoustic model.

9. The computer device of claim 6, wherein, before processing the first speech data of Mandarin and the first speech data of the P dialects respectively based on the pre-trained alignment model, the method further comprises:

obtaining fourth speech data of Mandarin and corresponding text information; and extracting a MFCC characteristic of each frame of the fourth speech data, and generating, according to the MFCC characteristic and the text information, the alignment model by training a parameter of a Gaussian mixture model based on maximum likelihood estimation.

10. The computer device of claim 6, wherein, after generating the $M_i$ types of target tags specifically used for the dialect i according to the $M_i$ types of tags whose error rates are greater than the preset threshold, the method further comprises:

updating a decoding dictionary according to the $M_i$ types of target tags.

11. A non-transitory computer readable storage medium having a computer program stored thereon that, when the program is executed by a processor, a modeling method for speech recognition, comprising:

processing first speech data of Mandarin and first speech data of P dialects respectively based on a pre-trained alignment model to obtain a tag corresponding to each frame of the first speech data, and counting the obtained tags and performing deduplication on tags of each type to determine N types of tags, N being a positive integer and P being a positive integer;

training a neural network according to second speech data of Mandarin, and generating a recognition model when the neural network converges, wherein outputs of the recognition model are the N types of tags;

inputting second speech data of the P dialects into the recognition model for processing respectively to obtain an output tag of each frame of the second speech data of each dialect;

for each dialect I of the P dialects, determining, according to the output tags and tagged true tags of the second speech data of each dialect, an error rate of each type of the N types of tags, wherein the error rate of a specific type of tag is a ratio of a total number of misclassifications for the specific type of tag to a total number of the specific type of tag in the tagged true tags;

for each dialect i of the P dialects, generating, according to $M_i$ types of tags whose error rates are greater than a preset threshold, $M_i$ types of target tags specially used for the dialect i, where $M_i$ being an integer greater than or equal to zero, and $0=<i<=P-1$; and training an acoustic model according to third speech data of Mandarin and third speech data of the P dialects, wherein outputs of the acoustic model are the N types of tags and the $M_i$ types of target tags corresponding to each dialect i of the P dialects.

12. The storage medium of claim 11, wherein inputting the second speech data of the P dialects into the recognition model for processing respectively, to obtain the output tag of each frame of the second speech data of each dialect comprises:

extracting a filter bank coefficient characteristic of the second speech data of the P dialects, and determining N posterior probabilities of each frame of the second speech data of each dialect according to the filter bank coefficient characteristic; and determining a tag corresponding to a maximum posterior probability in the N posterior probabilities as an output tag of a frame of the second speech data corresponding to the N posterior probabilities.

13. The storage medium of claim 11, wherein training the acoustic model according to the third speech data of Mandarin and the third speech data of the P dialects comprises:

generating training samples according to the third speech data of Mandarin, first tagged tags corresponding to the third speech data of Mandarin, the third speech data of the P dialects and second tagged tags corresponding to the third speech data of the P dialects;

for the third speech data of each dialect i of the P dialects, replacing the $M_i$ types of tags originally tagged whose error rates are greater than the preset threshold with corresponding $M_i$ types of target tags to obtain updated training samples; and training a processing parameter of a preset model according to a preset objective function and the updated training samples to obtain the acoustic model.

14. The storage medium of claim 11, wherein, before processing the first speech data of Mandarin and the first speech data of the P dialects respectively based on the pre-trained alignment model, the method further comprises:

obtaining fourth speech data of Mandarin and corresponding text information; and extracting a MFCC characteristic of each frame of the fourth speech data, and generating, according to the MFCC characteristic and the text information, the alignment model by training a parameter of a Gaussian mixture model based on maximum likelihood estimation.

15. The storage medium of claim 11, wherein, after generating the $M_i$ types of target tags specifically used for the dialect i according to the $M_i$ types of tags whose error rates are greater than the preset threshold, the method further comprises:

updating a decoding dictionary according to the $M_i$ types of target tags.

* * * * *